United States Patent [19]
Hotta et al.

[11] Patent Number: 5,919,890
[45] Date of Patent: Jul. 6, 1999

[54] METHOD FOR PRODUCTION OF POLYBENZAZOLE

[75] Inventors: Kiyoshi Hotta; Fuyuhiko Kubota; Yoshio Araki; Masakatsu Ohguchi, all of Ohtsu, Japan

[73] Assignee: Toyo Boseki Kabushiki Kaisha, Osaka, Japan

[21] Appl. No.: 08/835,850

[22] Filed: Apr. 30, 1997

[30] Foreign Application Priority Data

Apr. 30, 1996 [JP] Japan .................................. 8-109202

[51] Int. Cl.⁶ .................................................... C08G 63/00
[52] U.S. Cl. ......................... 528/184; 528/185; 528/172; 528/179; 528/207; 528/208; 528/210; 528/211
[58] Field of Search ..................................... 528/184, 185, 528/172, 179, 207, 208, 210, 211

[56] References Cited

U.S. PATENT DOCUMENTS 5,276,128   1/1994   Rosenberg et al. ..................... 528/184

FOREIGN PATENT DOCUMENTS 0 481 402 A2   4/1992   European Pat. Off. ................... 73/22

Primary Examiner—Duc Truong
Attorney, Agent, or Firm—Morrison & Foerster LLP

[57] ABSTRACT

A method for producing polybenzazole, which comprises reacting a PBZ monomer salt with an AA-PBZ monomer or a BB-PBZ monomer in a non-oxidizing solvent having a dehydrating action to give an oligomer, and adding the AA-PBZ monomer or BB-PBZ monomer, which has not been subjected to the above reaction, to allow reaction with the oligomer, whereby to give a polymer having a desired polymerization degree. According to this method, the polymerization degree of the polymer to be obtained finally and of the polymer during production process can be easily controlled.

2 Claims, No Drawings

METHOD FOR PRODUCTION OF POLYBENZAZOLE

TECHNICAL FIELD OF THE INVENTION

The present invention relates to a method for producing polybenzazole which can be formed into a high strength fiber and a film. More particularly, the present invention relates to an improvement in a method for controlling polymerization degree of polybenzazole.

BACKGROUND OF THE INVENTION

Polybenzazole represented by poly(paraphenylene benzobisoxazole), poly(paraphenylene benzobisthiazole), poly(paraphenylene benzobisimidazole) and the like is a polymer represented by the following formula (c), and known to be obtained by condensation polymerization of compounds (a) and (b) as shown in the following reaction formula (IV).

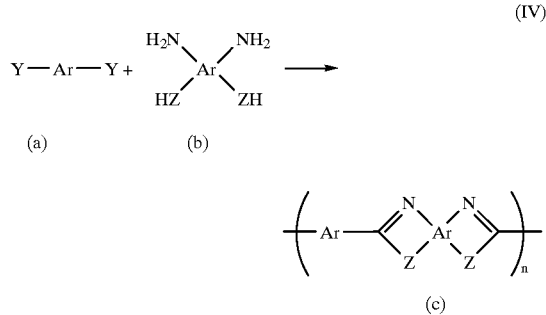

wherein each Ar is an aromatic group, each Y is a functional group having electron-deficient carbon, such as carboxyl, haloacyl, haloalkyl and nitrile, and each Z is —O—, —S— or —NH—.

The compounds (a) and (b), which are the starting materials of polybenzazole, are generally called AA-PBZ monomer and BB-PBZ monomer, respectively.

U.S. Pat. No. 5,276,128 discloses, besides a production method of polybenzazole from the above-mentioned AA-PBZ monomer and BB-PBZ monomer as starting materials, a production method using, as a starting material, a salt of PBZ monomer of the formula

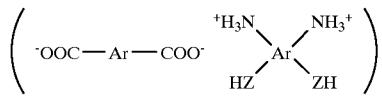

wherein each Ar is an aromatic group and each Z is —O— or —S—. This PBZ monomer salt gives polybenzazole through condensation polymerization thereof.

The polybenzazole thus obtained is utilized to give a fiber, a film and the like. The properties thereof such as strength and elastic modulus vary according to the polymerization degree of the polymers. For a stable production of the polymer, the polymerization degree should be accurately controlled during the production process. Accordingly, control of the polymerization degree of the polymer to be obtained ultimately and of the polymer during the production process is one of the important techniques for the production of polybenzazole.

In the production of polybenzazole using a PBZ monomer salt of the above-mentioned formula, since the composition molar ratio of the AA-PBZ monomer and BB-PBZ monomer is 1:1, 100% completion of the reaction theoretically makes the polymerization degree of the polymer finally obtained infinite. For a desired polymerization degree to be achieved, the degree of reaction should be controlled. While the degree of reaction can be controlled to some extent by changing reaction conditions such as polymerization temperature and reaction time, this route is highly likely associated with the risk that the production may not proceed due to an excessive increase in the polymerization degree at the residence part within a reactor or a transfer tube, as well as difficulty in responding to various production amounts. Consequently, it is practically very difficult to accurately control the polymerization degree by way of reaction conditions alone.

The above-mentioned U.S. Pat. No. 5,276,128 also discloses a method for controlling polymerization degree by the use of a chain-end terminator. In this case, the polymerization degree of the final polymer can be controlled, whereas control of the polymerization degree of the polymer during production process is still difficult to achieve, and unless the reaction degree of the polymer at the time when the end terminator is added is accurately controlled, the method is remotely practical in view of inconsistent molecular weight distribution of the obtained polymers.

Thus, there has not been known an effective method for controlling polymerization degree in the production of polybenzazole from a PBZ monomer salt as a starting material.

It is therefore an object of the present invention to provide a method for accurately controlling the polymerization degree in the production of polybenzazole from a PBZ monomer salt as a starting material, wherein the composition molar ratio of the AA-PBZ monomer and BB-PBZ monomer is 1:1.

SUMMARY OF THE INVENTION

As a result of the study and investigation in an attempt to solve the above-mentioned problems, the following method has been found for the first time to be practically useful for the production of polybenzazole from a PBZ monomer salt as a main starting material, wherein the composition molar ratio of AA-PBZ monomer and BB-PBZ monomer is 1:1. According to the present invention, there is provided a method for production of polybenzazole, which comprises reacting a PBZ monomer salt of the formula (I)

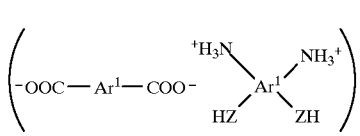

(I)

wherein each $Ar^1$ is an aromatic group and each Z is —O— or —S—, with an AA-PBZ monomer of the formula (II)

$$X—Ar^2—X \qquad (II)$$

wherein $Ar^2$ is an aromatic group and each X is carboxyl or a functional group derived from carboxyl, or a BB-PBZ monomer of the formula (III)

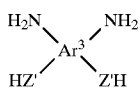

(III)

wherein $Ar^3$ is an aromatic group and each $Z'$ is —O—, —S— or —NH—, in a non-oxidizing solvent having a dehydrating action to give an oligomer, and adding the AA-PBZ monomer or BB-PBZ monomer, which has not been subjected to the above reaction, to allow reaction with the oligomer, whereby to give a polymer having a desired polymerization degree.

DETAILED DESCRIPTION OF THE INVENTION

The PBZ monomer salt to be used in the present invention is a compound of the aforementioned formula (I) wherein each $Ar^1$ may be the same or different and is an aromatic group having 6 to 12 carbon atoms. Preferred are phenyl and biphenyl and particularly preferred is phenyl. Each Z may be the same or different and is —O— or —S—. Specific examples of the PBZ monomer salt include terephthalate, isophthalate, 4,4'-bis(benzoic acid) salt and 4,4'-oxybis (benzoic acid) salt of 4,6-diaminoresorcinol, 2,4-diamino-1,5-dithiobenzene and 2,5-diamino-1,4-dithiobenzene. Of these, terephthalate of 4,6-diaminoresorcinol, 2,4-diamino-1,5-dithiobenzene and 2,5-diamino-1,4-dithiobenzene are preferably used.

The AA-PBZ monomer to be used in the present invention is a compound of the aforementioned formula (II) wherein each $Ar^2$ is an aromatic group having 6 to 12 carbon atoms, which may be phenyl, biphenyl and naphthyl, and an oxybiphenyl derived from the aromatic group, with particular preference given to phenyl. Each X may be the same or different and is carboxyl or a functional group derived from carboxyl, such as haloacyl and alkoxycarbonyl. Examples of preferable AA-PBZ monomer include dicarboxylic acids such as terephthalic acid, isophthalic acid, 4,4'-bis(benzoic acid), 4,4'-oxybis(benzoic acid) and 2,6-naphthalenedicarboxylic acid. In addition, dicarboxylic acid halide such as terephthaloyl chloride or dicarboxylate such as dimethylterephthalate, which are derivatives of the dicarboxylic acid, can be used.

The BB-PBZ monomer to be used in the present invention is a compound of the aforementioned formula (III) wherein each $Ar^3$ is an aromatic group having 6 to 12 carbon atoms, which may be phenyl, biphenyl, or an oxybiphenyl derived from the aromatic group, with particular preference given to phenyl. Each $Z'$ may be the same or different and is —O—, —S— or —H—. Specific examples of preferable BB-PBZ monomer include 4,6-diaminoresorcinol 2,4-diamino-1,5-dithiobenzene, 2,5-diamino-1,4-dithiobenzene, 1,2,4,5-tetraaminobenzene and 3',3,4',4-biphenyltetramine. In addition, salts of inorganic acid such as hydrochloride, sulfate, phosphate and the like of these monomers can be used. Accordingly, the BB-PBZ monomer in the present specification includes salts thereof. As the inorganic acid, phosphoric acid and sulfuric acid are preferable, since they do not generate volatile component during polymerization. When the content of BB-PBZ monomer to be reacted with the PBZ monomer salt is not more than 5 mol %, generation of volatile component poses no problems. Conversely, since detection of the volatile component advantageously confirms presence or otherwise of BB-PBZ monomer, hydrochloride is preferably used.

When the monomer to be reacted with the aforesaid PBZ monomer salt is AA-PBZ monomer, the compound to be added to the oligomer is BB-PBZ monomer. When used is BB-PBZ monomer, the compound to be added to the oligomer is AA-PBZ monomer. It is particularly preferable that the compound to be reacted with the PBZ monomer salt be BB-PBZ monomer and the monomer to be added to the oligomer be AA-PBZ monomer.

The content of AA-PBZ monomer or BB-PBZ monomer is preferably not more than 25 mol %, more preferably not more than 10 mol %, and particularly preferably not more than 5 mol %, of the PBZ monomer salt. The lower limit thereof is preferably one mol %. In the present invention, either AA-PBZ monomer or BB-PBZ monomer is placed with the above-mentioned PBZ monomer salt to allow reaction thereof to give an oligomer having an intrinsic viscosity of not more than about 10 dL/g, particularly preferably 1.0–9.0 dL/g.

The non-oxidizing solvent having a dehydrating action to be used in the present invention may be polyphosphoric acid, sulfuric acid, methanesulfonic acid or a mixture thereof. For an enhanced dehydrating action of the solvent, a suitable amount of phosphorus pentoxide may be added. In this case, polyphosphoric acid is preferably used as the solvent.

The method of the present invention is concretely described in the following.

A PBZ salt (5–50 parts by weight, preferably 10–40 parts by weight), a selected amount of AA-PBZ monomer or BB-PBZ monomer, and when necessary, phosphorus pentoxide (not more than 50 parts by weight) are added to 100 parts by weight of a non-oxidizing solvent having a dehydrating action such as polyphosphoric acid, and the mixture is reacted at not more than 200° C., preferably 30–180° C., to give an oligomer having an intrinsic viscosity of not more than 10 dL/g. Then, AA-PBZ monomer or BB-PBZ monomer, which is different from the one used in the above reaction, is added to the oligomer and reacted at 100–300° C., preferably 150–250° C., to give a final PBZ polymer. On this occasion, it is possible to control polymerization degree by determining, on line, physical properties such as viscosity to be the indices of polymerization degree of the obtained polymer, in accord with which the content of the AA-PBZ monomer or BB-PBZ monomer is successively varied.

The desired polymerization degree of the PBZ polymer is determined by the amount of AA-PBZ monomer or BB-PBZ monomer to be added to the oligomer. A molar ratio of AA-PBZ monomer/BB-PBZ monomer which is closer to 1 means higher polymerization degree of the obtained polymer. While the number average degree of polymerization of the PBZ polymer is not particularly limited, it is generally from 200 to 1000 [n of the formula (c): 100–500].

The obtained polymer can be formed into fiber, film and the like, and a fiber formed therefrom can be used for reinforcing materials such as cement, rubber and plastic, protection clothing, flametight material, friction material and the like to utilize noticeably superior strength and heat resistance of the fiber.

The present invention is described in more detail by way of Examples, which should not be construed as limiting the invention. The intrinsic viscosity in Examples was determined at 25° C. using methanesulfonic acid as a solvent.

COMPARATIVE EXAMPLE 1

4,6-Diaminoresorcinol/terephthalate (13.12 g, 42.8 mmol), 116% polyphosphoric acid (43.9 g) and phosphorus pentoxide (14.5 g) were mixed by stirring at 70° C. under a nitrogen stream, and reacted for 72 hours at 130° C. The obtained polybenzazole had a very high intrinsic viscosity of 48.5 dL/g, which resulted in adhesion of the polymer to a stirring shaft, thereby making homogeneous mixing difficult.

EXAMPLE 1

4,6-Diaminoresorcinol/terephthalate (25.39 g, 82.9 mmol), 4,6-diaminoresorcinol hydrochloride (0.60 g, 2.8 mmol), 116% polyphosphoric acid (87.8 g) and phosphorus pentoxide (29.0 g) were mixed by stirring at 70° C. under a nitrogen stream, and reacted at 130° C. The oligomer was taken by 40 g every 24 hours. A predetermined amount of terephthalic acid was added to the obtained oligomer and the mixture was reacted at 200° C. for 2 hours to synthesize a polymer. The results are shown in Table 1.

TABLE 1

| reaction time | intrinsic viscosity of oligomer | amount of terephthalic acid added | intrinsic viscosity of polymer |
|---|---|---|---|
| 24 hours | 5.6 dL/g | 100 mg | 21.3 dL/g |
| 48 hours | 5.8 dL/g | 100 mg | 22.0 dL/g |
| 72 hours | 5.8 dL/g | 100 mg | 21.6 dL/g |

As shown in Table 1, the intrinsic viscosity of the oligomer was stably maintained at 5–6 dL/g 24, 48 and 72 hours later. Homogeneous agitation was easily achieved, and the polymer was free of excessive increase in polymerization degree or decrease in polymerization degree due to thermal decomposition. Addition of terephthalic acid to the oligomer and polymerization thereof led to an increase in polymerization degree of the final polymer. The results confirm that polymerizability was not affected after an extended time of reaction.

EXAMPLE 2

4,6-Diaminoresorcinol/terephthalate (25.38 g, 82.9 mmol), 4,6-diaminoresorcinol hydrochloride (0.58 g, 2.6 mmol), 116% polyphosphoric acid (87.8 g) and phosphorus pentoxide (29.0 g) were mixed by stirring at 70° C. under a nitrogen streams and reacted for 24 hours at 130° C. to synthesize a polymer. The oligomer had an intrinsic viscosity of 5.5 dL/g.

The obtained oligomer was taken by 40 g and placed in a reactor. A predetermined amount of terephthalic acid was added and the mixture was reacted at 200° C. for 2 hours to synthesize a polymer. The results are shown in Table 2.

TABLE 2

| amount of terephthalic acid added | intrinsic viscosity of polymer |
|---|---|
| 87 mg | 15.4 dL/g |
| 99 mg | 22.2 dL/g |
| 104 mg | 28.0 dL/g |

As is evident from Table 2, the intrinsic viscosity of each polymer was 10–30 dL/g. The results confirm that polymerization degree could be easily controlled.

EXAMPLE 3

In the same manner as in Example 2, other PBZ monomer salts were used to synthesize polybenzazole oligomers and polymers. The results are shown in Table 3. In every case, the oligomer permitted homogeneous agitation, and by varying the amount of monomer to be added, the intrinsic viscosity of polybenzazole polymer could be changed, thus confirming easy control of polymerization degree.

TABLE 3

| PBZ salt | monomer reacted with PBZ salt | (mol %) | intrinsic viscosity of oligomer (dL/g) | added monomer | (mol %) | intrinsic viscosity of polymer (dL/g) |
|---|---|---|---|---|---|---|
| DAR/TA | DAR-Cl | 6.0 | 1.2 | TA-Cl | 5.6 | 28.5 |
| DAR/TA | TA-Cl | 1.2 | 8.1 | DAR-Cl | 0.8 | 27.8 |
| DAR/TA | DAR-Cl | 1.2 | 8.5 | DMT | 0.6 | 18.0 |
| DAR/TA | DAR-P | 3.0 | 5.1 | TA | 2.7 | 33.4 |
| DAR/TA | DAT | 5.0 | 3.3 | IA | 4.6 | 20.4 |
| DAR/TA | BPTA | 5.0 | 0.5 | TA | 4.6 | 16.2 |
| DAR/IA | DAR-Cl | 3.0 | 2.4 | IA | 2.5 | 18.1 |
| DAR/BBA | DAR-Cl | 3.0 | 0.5 | BBA | 2.6 | 23.4 |
| DAR/OBBA | DAR-Cl | 3.0 | 0.7 | OBBA | 2.6 | 15.5 |
| DAT/TA | DAT | 5.0 | 1.3 | TA | 4.6 | 26.3 |
| DAT/TA | TA-Cl | 5.0 | 1.2 | DAT | 4.0 | 12.1 |

Note that the amounts added of AA-PBZ monomer and BB-PBZ monomer in Table 3 are expressed by mol % relative to PBZ monomer salt.

| Abbreviations in Table 3 | |
|---|---|
| DAR/TA | 4,6-diaminoresorcinol terephthalate |
| DAR/IA | 4,6-diaminoresorcinol isophthalate |
| DAR/BBA | 4,6-diaminoresorcinol/4,4'-bis(benzoic acid) salt |
| DAR/OBBA | 4,6-diaminoresorcinol/4,4'-oxybis(benzoic acid) salt |
| DAT/TA | 2,5-diamino-1,4-dithiobenzene terephthalate |
| DAR-Cl | 4,6-diaminoresorcinol hydrochloride |
| DAR-P | 4,6-diaminoresorcinol diphosphate |
| DAT | 2,5-diamino-1,4-dithiobenzene hydrochloride |
| BPTA | 3',3,4',4-biphenyltetramine |
| TA | terephthalic acid |
| TA-Cl | terephthaloyl chloride |
| DMT | dimethyl terephthalate |
| IA | isophthalic acid |
| BBA | 4,4'-bis(benzoic acid) |
| OBBA | 4,4'-oxybis(benzoic acid) |

The above-mentioned method for producing polybenzazole of the present invention enables accurate control of polymerization degree of the polymer during production process and of the polymer finally obtained. To be specific, since reaction completes at a certain polymerization degree, excessive increase in polymerization degree can be avoided, which excess is found at a residence part in a polymerization reactor or a transfer tube and may stop the production process. In addition, the method permits variation of production amounts, since oligomer can be stored stably. What is more, inasmuch as the obtained oligomer retains polymerizability, a polymer having a desired polymerization degree can be obtained by reacting a predetermined amount of the oligomer and AA-PBZ monomer or BB-PBZ monomer, which acts as a chain extender. In other words, oligomerization and polymerization processes can be separated, whereby control of polymerization degree during production can be facilitated, which in turn enables stable industrial production to greatly contribute to the industrial field.

What is claimed is:

1. A method for producing a polybenzazole, which comprises reacting a PBZ monomer salt of the formula (I)

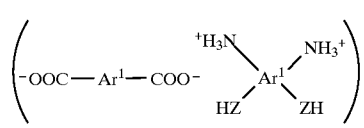
(I)

wherein each Ar$^1$ is an aromatic group and each Z is —O— or —S—, with an AA-PBZ monomer of the formula (II)

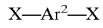
(II)

wherein Ar$^2$ is an aromatic group and each X is carboxyl or a functional group derived from carboxyl or a BB-PBZ monomer of the formula (III)

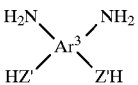
(III)

wherein Ar$^3$ is an aromatic group and each Z' is —O—, —S— or —NH—, in a non-oxidizing solvent having a dehydrating action to give an oligomer, and adding the AA-PBZ monomer or BB-PBZ monomer, which has not been subjected to the above reaction to allow reaction with the oligomer.

2. The method of claim 1 wherein the AA-PBZ monomer (II) or BB-PBZ monomer (III) is used in an amount of not more than 25 mol % of the PBZ monomer salt (I).

\* \* \* \* \*